United States Patent Office  3,848,000
Patented Nov. 12, 1974

3,848,000
METHYLENE-SULPHONES FROM THE TERPENE SERIES
Pierre Chabardes, Lyon, Marc Julia, Paris, and Albert Menet, La Mulatiere, France, assignors to Rhone-Poulenc S.A., Paris, France
No Drawing. Filed Feb. 1, 1973, Ser. No. 328,612
Claims priority, application France, Feb. 4, 1972, 7203805; Apr. 10, 1972, 7212479; Oct. 6, 1972, 7235485
Int. Cl. C07c 147/04
U.S. Cl. 260—607 A                12 Claims

ABSTRACT OF THE DISCLOSURE

Sulphones useful for preparing polyenes have the formula:

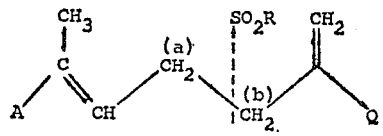

where the sulphonyl group replaces a hydrogen atom on carbon atom (a) or (b), R represents alkyl, alkylaryl or aryl, Q represents hydrogen, methyl or vinyl, A represents an optionally substituted hydrocarbon of $5n+1$ carbon atoms ($n$ is 1–8), methyl optionally substituted by halogen, sulphide or sulphone, $CH_2OH$ (or an ether or ester thereof), CHO (optionally protected) or COOH (or an acid chloride, ester or nitrile thereof).

---

The invention relates to methylene sulphones of the terpene series.

The present invention provides a sulphone corresponding to the general formula:

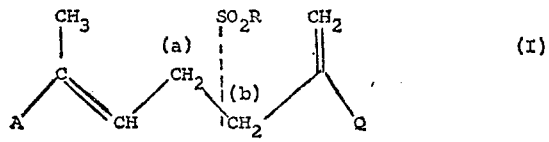 (I)

in which the sulphonyl group replaces hydrogen atom on carbon atom (a) or (b),

R represents an alkyl (e.g. of 1 to 4 carbon atoms), alkyl-aryl or aryl radical, each of which is substituted or unsubstituted, Q represents hydrogen, methyl or vinyl, A represents (a) a hydrocarbon radical containing $5n+1$ carbon atoms, ($n$ being an integer of 1 to 8), which is substituted or unsubstituted,
(b) a methyl radical, which is unsubstituted or substituted by a halogen atom or a sulphide or sulphone group,
(c) a primary alcohol group —$CH_2OH$, an ether group thereof or an ester group which it forms with an inorganic or organic acid,
(d) a free or protected aldehyde group or
(e) an acid group —COOH, its acid chloride group, an ester group thereof or a nitrile group.

The hydrocarbon radical represented by A can be saturated or unsaturated with conjugated and/or unconjugated ethylenic unsaturation and can possess functional groups and/or it can be substituted by alkyl groups. When $n$ is 2 to 8, this radical can contain a ring to which alkyl groups and/or functional groups such as $O=$ or —OH are optionally attached, the functional groups being free or protected.

The hydrocarbon radical represented by A is preferably a group having a carbon skeleton of formula:

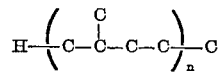

wherein $n$ is 1–8, each $C_5$ unit containing 0–2 ethylenic double bonds, the remaining valencies being satisfied by hydrogen atoms, or two adjacent $C_5$ units are joined to form a structure containing a ring of 6 ring carbon atoms which can be substituted by a hydroxy or oxo group or by a methyl group additional to the methyl substituents forming part of the carbon skeleton of $C_5$ units. Examples of such groups are formula:

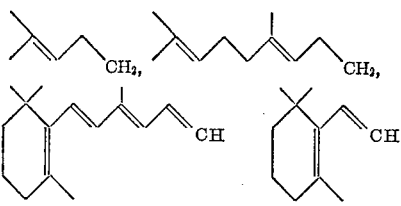

Other preferred examples of radical A are methyl and a radical of formula —$CH_2SO_2R'$ where R' represents an alkyl (e.g. of 1 to 4 carbon atoms), alkylaryl or aryl radical, each of which is substituted or unsubstituted.

Radicals R and R' preferably represent aryl radicals, e.g. aromatic hydrocarbon radicals (such as phenyl radicals), which are unsubstituted or substituted e.g. by chlorine or alkyl of preferably 1–4 carbon atoms.

The present invention also provides a process for the preparation of a sulphone as defined above which comprises reacting a sulphone of the formula $$A—C(CH_3)=CH—CH_2X$$

with a compound of the formula $YCH_2—C(Q)=CH_2$, wherein one of X and Y represents a halogen and the other a group $SO_2R$, in the presence of a basic agent capable of converting the compound in which X or Y represents an $SO_2R$ group into its anion, A, Q and R being as defined above.

This process has two embodiments. In the first for preparing the sulphone with the sulphone group replacing a hydrogen atom on carbon atom (a) the process comprises reacting a sulphone of the formula $$A—C(CH_3)=CH—CH_2SO_2R$$

(II) with a halide of the formula $X—CH_2—C(Q)=CH_2$, in the presence of a basic agent capable of converting the sulphone II into its anion, A, Q and R being as defined above and X representing a halogen atom, and in particular chlorine or bromine. An equation for the reaction can be given as follows:

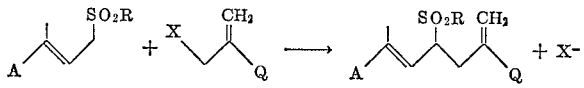

The halides employed are generally allyl halides, methallyl halides and halogeno-methyl-butadienes, and particularly allyl or methallyl chloride or bromide, or chloro- or bromo-methyl-butadiene.

In the second embodiment for preparing the sulphones of formula I with the sulphone group replacing a hydrogen atom on carbon atom (b), a halide of the formula $A—C(CH_3)=CH—CH_2X$ (IV) and a sulphone of the formula $R—SO_2CH_2—C(Q)=CH_2$ (III) are reacted together, in the presence of a basic agent capable of converting the sulphone III into its anion.

Examples of halides of the general formula IV $$A—C(CH_3)=CH—CH_2X$$

are prenyl halides, geranyl halides, and farnesyl halides and more generally polyterpene halides of various degrees of saturation, optionally containing a trimethylcyclohexyl ring.

In the second embodiment of the process the sulphone employed is, for example, an allyl-sulphone such as methyl-allyl-sulphone or phenyl-allyl-sulphone. In the first embodiment of the process, a terpene sulphone is used which can be an alkyl-isoprenyl-sulphone or an aryl-isoprenyl-sulphone, an alkyl- or aryl-geranyl-sulphone, an alkyl- (or aryl) farnesyl-sulphone, or an alkyl- (or aryl) retinyl-sulphone.

Compounds of formula A—C(CH$_3$)=CH—CH$_2$SO$_2$R wherein A represents a 2-(2,6,6-trimethyl cyclohex-1-enyl) ethylene group are described and claimed in Ser. No. 218,838 filed 18th January 1972 by Marc Julia, now U.S. Pat. No. 3,781,313. They may be prepared by reacting an alkali metal sulphinate of formula RSO$_2$M, wherein R and M are as defined above either with a compound of formula A—C(CH$_3$)=CH—CH$_2$X, wherein X represents chlorine, bromine or iodine, obtained by halogenation of vinyl-$\beta$-ionol with a phosphorus trihalide, or with vinyl-$\beta$-ionol itself.

Compounds of formula A—C(CH$_3$)=CH—CH$_2$SO$_2$R in which A represents a 6-(2,6,6 - trimethylcyclohex-1-enyl)- 4-methylhexa-1,3,5 - trienyl radical are described and claimed in Ser. No. 254,103 filed 17th May 1972 in the names of Pierre Chabardes and Marc Julia. They may be prepared by reacting an alkali metal sulphinate with retinol or a retinol ester of an inorganic or organic acid e.g. retinyl chloride, or with 3-retinol.

Retinyl halides, which are known compounds, are preferably prepared by a process comprising reacting 1-(or 3) retinol with a halogenating reagent (e.g. phosphorus trichloride or tribromide) at a low temperature and in an inert solvent. This process is described and claimed in Ser. No. 254,102 filed 17th May 1972 in the name of Pierre Chabardes, now abandoned.

Compounds of formula A—C(CH$_3$)=CH—CH$_2$SO$_2$R wherein A represents a group —CH$_2$X or CH$_2$SO$_2$R, where X represents a halogen, are described and claimed in Ser. No. 328,600 filed 1st February 1973 by Albert Menet. They may be prepared by reacting an alkali metal sulphinate of formula RSO$_2$M with a 1,4-dihalogeno-2-methylbut-2-ene, or, when A represents a group CH$_2$SO$_2$R, with a compound of formula

X—C(CH$_3$)=CH—CH$_2$SO$_2$R where X represents a halogen.

Compounds of formula A—C(CH$_3$)=CH—CH$_2$SO$_2$R wherein A represents a group CH$_2$OR$_1$ where R$_1$ represents an alkyl or aryl group which may be substituted, are described and claimed in Ser. No. 328,611 filed 1st February 1973 by Albert Menet. They may be prepared by reacting an alkali metal compound of formula R$_1$OM with a 4-alkyl-(or aryl) sulphonyl-2-methyl but- 2-enyl halide.

The processes of the invention are carried out in the presence of a basic agent which possesses sufficient activity to convert the sulphone employed into an anion. The basic agents which are suitable are inorganic or organic compounds, examples of which are alkali metal alcoholates, alkali metal hydrides or amides, and organometallic compounds such as organo-zinc, organo-lithium and organo-magnesium compounds. They can be used alone or in conjunction with another basic agent intended to neutralise the hydrogen halide formed. When the basic agent is used alone, the amount employed must be sufficient to achieve this neutralisation. The amount used also depends on how the reaction is carried out and on the reactivity of the products of the reaction with respect to this basic agent. For these various reasons, it can be advantageous to employ a smaller amount of basic agent in the reaction and then to add another basic agent, towards which the products of the reaction are less sensitive, in an amount sufficient to neutralise the hydrogen halide formed.

The reaction can be carried out at temperatures, which can range from =100° C. to +150° C., depending on the nature of the products employed and produced.

In order that the reaction can take place satisfactorily, it is advantageous to carry it out in an organic solvent, which can be a hydrocarbon such as hexane, benzene or toluene, a protic solvent, e.g. methanol, ethanol or ethylene glycol, or a linear or cyclic ether of a monoalcohol or a diol such as diethyl ether, dioxane or tetrahydrofuran. Other solvents such as dimethylformamide, dimethyl-acetamide, dimethylsulphoxide, N-methylpyrrolidone and hexamethylphosphotriamide are also suitable.

In certain cases, e.g. when A represents a CH$_2$SO$_2$R' radical, wherein R' is as defined above, the halogenated compound A—C(CH$_3$)=CH—CH$_2$X can be replaced by a compound which possesses a terminal conjugated diene chain of the formula A'=C(CH$_3$)—CH=CH$_2$, wherein A' represents a divalent radical such that A'H corresponds to the radical A as defined above. This diene compound reacts with a sulphone RSO$_2$—CH$_2$—C(Q)=CH$_2$ according to the equation:

This reaction is carried out in the presence of an inorganic or organic alkaline agent such as an alkali metal hydroxide or alcoholate, an amine such as diethylamine, diisopropylamine, pyridine, triethylamine and tributylamine, or a quaternary ammonium hydroxide. The reaction can be carried out with or without a solvent but it is however preferable to choose a solvent so that the reaction takes place in a homogeneous phase. This solvent can be an alcohol such as methanol, ethanol and tertiary butyl alcohol, or an ether such as diethyl ether, dioxane and tetrahydrofuran or any other inert solvent such as benzene, toluene, dimethylformamide, or acetonitrile.

This reaction takes place at ambient temperature and, where the reaction products are not affected by heating, the reaction can be accelerated by carrying it out at a higher temperature. If the reaction products are sensitive to heat, the reaction can be carried out at temperatures below ambient temperature. A description of all the working conditions relating to the Michael reaction, which are applicable in this case, will be found in "Organic Reactions," Vol. 10, pages 264–266 "The Michael Reaction."

The compounds of the formula I may be converted by desulphonation to terpene compounds which contain a terminal vinyl or butadiene group. Desulphonation can be carried out by a simple reduction e.g. with lithium/ethylamine and compounds of formula:

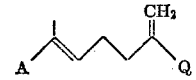

are then obtained, examples of such compounds being 2,6-dimethyl-2,6-heptadiene, myrcene (used in perfumery), sinensals and farnesenes.

Desulphonation can also be carried out by means of an inorganic or organic basic agent such as an alkali metal hydroxide, an alkali metal carbonate or an alkali metal alcoholate, and diene compounds are then formed which are of formula:

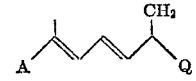

The presence of the conjugated polyene chain makes these compounds very reactive e.g. towards dimerisation, oligomerisation, or diene syntheses.

Whatever the desulphonation treatment chosen, it results in the liberation of an alkali metal sulphinate or a sulphinic acid which can be used again to prepare the starting sulphones according to a conventional process for the preparation of sulphones. Such a conventional process consists of reacting an alkyl halide with an alkali metal sulphinate, for example, an alkali metal phenylsulphinate or methylsulphinate. Thus, since the synthesis of the terpene compounds proceeds via these sulphones as intermediates, practically no alkali metal sulphinate is consumed.

The following examples illustrate the preparation of sulphones according to the invention.

EXAMPLE 1

4.48 g. of potassium tertiary butylate ($4 \times 10^{-2}$ mols) and 25 cm.$^3$ of tetrahydrofuran are introduced into a 110 cm.$^3$ three-necked flask equipped with a stirrer, a condenser, a thermometer, a dropping funnel and a nitrogen inlet. The mixture is cooled under argon to $-30°$ C. and a solution of 4.2 g. of phenyl - 3 - methyl-but-2-enyl-sulphone ($2 \times 10^{-2}$ mol) in 14 cm.$^3$ of tetrahydrofuran is added over the course of 10 minutes.

The mixture is left for 5 minutes at $-30°$ C. and a solution of 2.2 g. of chloromethyl-butadiene ($2.2 \times 10^{-2}$ mol) in 8 cm.$^3$ of tetrahydrofuran is added over the course of 10 minutes.

The reaction mixture is left at 30° C. for 2 hours 30 minutes, whilst being stirred, and is then poured into 300 cm.$^3$ of water and 300 cm.$^3$ of diethyl ether. After decanting and extracting the aqueous phase with 3 times 100 cm.$^3$ of diethyl ether, the ether solution is washed with 3 times 50 cm.$^3$ of water, dried over magnesium sulphate and then concentrated.

5.45 g. of whitish crystalline product are obtained, in which 7 - methyl - 5 - phenylsulphonyl-3-methylene-1,6-octadiene is identified and measured.

93% yield relative to the sulphone employed and degree of conversion of the latter: 90%.

EXAMPLE 2

1.88 g. of potassium t-butylate and 3 cm.$^3$ of tetrahydrofuran are introduced into an apparatus identical to that of the preceding example.

The mixture is cooled to $-20°$ C. and a solution of 1.05 g. of phenyl - 3 - methyl-but-2-enyl-sulphone in 4 cm.$^3$ of tetrahydrofuran is run in over the course of 2 minutes. A solution of 0.76 g. of allyl chloride in 2 cm.$^3$ of tetrahydrofuran is then run in over the course of 2 minutes. The mixture is then left to react for 1 hour at $-10°$ C., then for 1 hour at 0° C., and finally for 2 hours at ambient temperature (21° C.).

The reaction mixture is then poured into a mixture of 25 cm.$^3$ of water and 25 cm.$^3$ of diethyl ether. The aqueous layer is decanted and extracted with twice 20 cm.$^3$ of diethyl ether. The ether layers are washed with twice 25 cm.$^3$ of water, dried over magnesium sulphate, filtered and concentrated. A yellow fluid oil, which contains 0.55 g. of 6 - methyl - 4 - phenylsulphonyl-1,5-heptadiene, is obtained.

Yield relative to the sulphone employed: 44%.

EXAMPLE 3

8.96 g. of potassium t-butylate and 30 cm.$^3$ of tetrahydrofuran are introduced into a 100 cm.$^3$ flask equipped as for the preceding examples. The mixture is cooled under argon to $-30°$ C. and a solution of 13.78 g. of phenyl-5 - (2,6,6 - trimethyl - cyclohex - 1 - enyl)-3-methyl-penta - 2,4 - dienyl-sulphone ($4 \times 10^{-2}$ mol) in 30 cm.$^3$ of tetrahydrofuran is added over the course of 20 minutes. The mixture is left at $-30°$ C. for 10 minutes and a solution of 4.1 g. of chloromethyl-butadiene in 10 cm.$^3$ of tetrahydrofuran is added over the course of 10 minutes. The reaction mixture is left at $-30°$ C. for 5 hours, whilst being stirred, and is then poured into 300 cm.$^3$ of water and 300 cm.$^3$ of ether. After decanting and extracting the aqueous phase with 3 times 100 cm.$^3$ of diethyl ether, the ether solution is washed with 3 times 50 cm.$^3$ of water, dried and then concentrated. 18.4 g. of a viscous oil are obtained, in which a product of the formula:

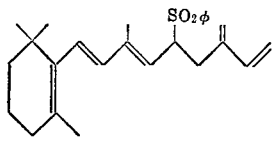

is identified and measured by nuclear magnetic resonance and thin layer chromatography.

Yield: 81% relative to the sulphone employed, for which the degree of conversion is 100%.

The starting sulphone was prepared by reacting an alkali metal sulphinate with 1 - chloro - 3 - methyl-5-(2,6,6 - trimethyl - cyclohex - 1 - enyl) - 2,4-pentadiene according to the process described in Ser. No. 218,838 filed 18th January 1972 by Marc Julia now U.S. Pat. No. 3,781,313.

EXAMPLE 4

0.640 g. of potassium methylate suspended in 5 cm.$^3$ of anhydrous tetrahydrofuran is introduced into a flask equipped with a condenser, a dropping funnel and a nitrogen inlet. The mixture is cooled to $-25°$ C. and a solution of 1.04 g. of 2 - phenyl-sulphonylmethyl-butadiene in 10 cm.$^3$ of tetrahydrofuran is run in over the course of 5 minutes. A solution of 1.04 g. of 1 - phenyl-sulphonyl - 2 - methyl - butadiene in 5 cm.$^3$ of tetrahydrofuran is then run in over the course of 10 minutes. The reaction mixture is left to react for 1 hour 15 minutes at $-20°$ C. and it is then poured into a mixture of 80 cm.$^3$ of iced water and 30 cm.$^3$ of diethyl ether. The aqueous layer is decanted and extracted with 3 times 40 cm.$^3$ of diethyl ether. The combined ether layers are dried over magnesium sulphate and concentrated in vacuo. An orange viscous product is obtained in which 1.57 g. of a compound of the formula:

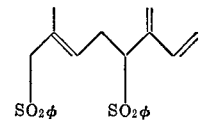

is identified and measured by I.R. spectrography, N.M.R. and thin layer chromatography.

Degree of conversion: 100%—yield: 75%.

1 - Phenylsulphonyl - 2 - methyl-butadiene can be prepared according to the process described in Jouranl of Organic Chemistry, 35, 4219 (1970).

2 - Phenylsulphonylmethyl-butadiene was prepared by allowing sodium phenylsulphinate to react with 2-chloromethylbutadiene, at ambient temperature in dimethylsulphoxide.

EXAMPLE 5

3.35 g. of potassium t-butylate and 15 cm.$^3$ of tetrahydrofuran are introduced into a flask equipped with a condenser, a dropping funnel and a nitrogen inlet. The flask is cooled to $-20°$ C., 5.25 g. of phenyl-3-methyl-but-2-enyl-sulphone are introduced and then 2.26 g. of methallyl chloride are run in over the course of 2 minutes. The temperature is then allowed to rise to $-10°$ C. and the mixture is kept at this temperature for one hour, with stirring, and then at ambient temperature for 4 hours. The reaction mixture is taken up in 50 cm.$^3$ of distilled water $+50$ cm.$^3$ of diethyl ether; the aqueous layer is decanted and extracted with 50 cm.$^3$ of diethyl ether. The combined ether layers are dried over sodium sulphate and then concentrated by evaporation. 5.7 g. of a solid product, in the form of cream white crystals, are thus isolated in which 1.4 g. of unconverted sulphone and 4.2 g. of a product of the formula:

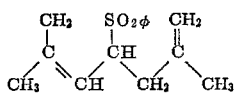

are identified and measured by I.R. spectrography, N.M.R. and thin layer chromatography. Degree of conversion 72.3%. Yield 89%. On recrystalisation from di-isopropyl ether, the product is obtained in the form of white crystals of melting point 98° C.

We claim:

1. A sulphone corresponding to the general formula:

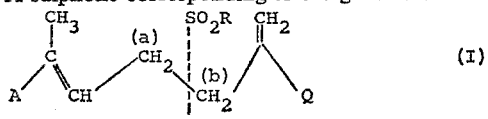

in which the sulphonyl group replaces the hydrogen atom on carbon atom (a) or (b), R represents an alkyl, alkyl-phenyl or phenyl radical wherein the alkyl has from 1 to 4 carbon atoms;

Q represents hydrogen, methyl or vinyl;

A represents
  (a) a hydrocarbon radical containing $5n+1$ carbon atoms ($n$ being an integer of 1 to 8),
  (b) a methyl radical, which is unsubstituted or substituted by a halogen atom or a sulphide or sulphone group, or
  (c) a primary alcohol group —$CH_2OH$.

2. A sulphone according to claim 1 wherein the hydrocarbon radical represented by A is a group having a carbon skeleton of formula

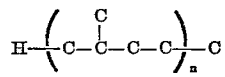

wherein $n$ is 1–8, each $C_5$ unit containing 0–2 ethylenic double bonds, the remaining valencies being satisfied by hydrogen atoms, or two adjacent $C_5$ units are joined to form a structure containing a ring of 6 ring carbon atoms, which can be substituted by a hydroxy or oxo group or by a methyl group additional to the methyl substituents forming part of the carbon skeleton of $C_5$ units.

3. A sulphone according to claim 1 wherein R represents a phenyl radical.

4. A sulphone according to claim 1 wherein A represents a methyl radical.

5. A sulphone according to claim 1 wherein A represents a 2-(2,6,6 - trimethylcyclohex - 1 - enyl)-ethylene radical.

6. A sulphone according to claim 1 wherein A represents a radical of the formula —$CH_2SO_2R^1$, where $R^1$ represents an alkyl, alkyl-phenyl or phenyl radical wherein the alkyl has from 1 to 4 carbon atoms.

7. A sulphone according to claim 6 wherein R' represents a phenyl radical.

8. 9-(2,6,6 - Trimethyl-cyclohex - 1 - enyl)-7-methyl-5-phenylsulphonyl-3-methylene-1,6,8-nonatriene.

9. 7 - Methyl - 5 - phenylsulphonyl-3-methylene-1,6-octadiene.

10. 7 - Methyl - 4,8 - bis-phenylsulphonyl-3-methylene-1,6-octadiene.

11. 6-Methyl-4-phenylsulpuhonyl-1,5-heptadiene.

12. 2,6-Dimethyl-4-phenylsulphonyl-1,5-heptadiene.

References Cited
UNITED STATES PATENTS

| | | | |
|---|---|---|---|
| 3,781,313 | 12/1973 | Julia | 260—607 A |
| 3,655,620 | 4/1972 | Julia | 260—607 A |

LEWIS GOTTS, Primary Examiner

D. R. PHILLIPS, Assistant Examiner

U.S. Cl. X.R.

260—601 R, 400, 680 R, 465 K, 465.9